United States Patent [19]

Grover et al.

[11] 3,973,058

[45] Aug. 3, 1976

[54] METHOD FOR PRINTING INTERLAYERS FOR LAMINATED SAFETY GLASS

[75] Inventors: John L. Grover; Wilson H. Power, both of Wilbraham, Mass.

[73] Assignee: Monsanto Company, St. Louis, Mo.

[22] Filed: Dec. 23, 1974

[21] Appl. No.: 535,652

[52] U.S. Cl. .............................. 427/163; 427/164; 427/256; 8/4; 428/195; 428/437; 428/210
[51] Int. Cl.² ...................... B60J 3/00; B32B 17/10
[58] Field of Search ............ 156/100; 161/204; 8/4; 117/37, 38; 427/256, 286, 163, 164; 428/195, 210, 437

[56] References Cited
UNITED STATES PATENTS

| | | | |
|---|---|---|---|
| 2,739,080 | 3/1956 | Woodworth | 117/38 |
| 2,989,360 | 6/1961 | Mautner | 8/55 |
| 3,008,858 | 11/1961 | Blake et al. | 117/38 X |
| 3,029,122 | 4/1962 | Posselt et al. | 8/46 |
| 3,088,837 | 5/1963 | Prescott | 106/262 |
| 3,265,461 | 8/1966 | Luetzel et al. | 8/84 |
| 3,346,322 | 10/1967 | Finkenauer et al. | 8/79 |
| 3,591,406 | 7/1971 | Moynihan | 117/37 |

*Primary Examiner*—Ralph S. Kendall

[57] ABSTRACT

Disclosed herein is an improved printing method for tinting synthetic resin sheets used in the manufacture of laminated safety glass. The improvement comprises using an ink containing 12 to 35% by weight, based on the total weight of dye and solvent, of one or more dyes dissolved in an N-lower alkyl-pyrrolidone solvent wherein the alkyl group contains from 1 to 4 carbon atoms.

8 Claims, No Drawings

3,973,058

METHOD FOR PRINTING INTERLAYERS FOR LAMINATED SAFETY GLASS

BACKGROUND OF THE INVENTION

1. Field of the Invention

The present invention relates to an improved printing method for tinting synthetic resin sheets used in the manufacture of laminated safety glass. More particularly, the invention relates to an improved method for obtaining a gradient color band on the synthetic resin sheet component of laminated safety glass used in automobile windshields.

2. Description of the Prior Art

Laminated safety glass is well knwon in the art for use as glazing units for vehicles, especially automobile windshields, and for architectural uses. Laminated safety glass comprises at least one shield of glass laminated to at least one sheet of a synthetic resin material which is usually referred to as the interlayer. The laminate may be the sandwich type construction wherein the interlayer is interposed between two pieces of glass. Alternately, the laminate may comprise a single sheet of glass laminated to a synthetic resin sheet (also referred to as an interlayer for the purposes of the present invention). In the latter bilayer type of laminated safety glass the synthetic resin sheet may optionally be coated with or laminated to another synthetic polymeric material.

Inks for tinting interlayer material used in the preparation of laminated safety glass are well known in the prior art. These inks are described, inter alia, in U.S. Pat. Nos. 2,636,420, 2,739,080, 2,914,373, 3,346,526, 3,441,361, and 3,591,406. These inks, which comprise a dye and a solvent, are normally applied to the interlayer by contact printing methods which are well known to those skilled in the art. The preferred method is rotogravure printing which method involves the printing of a series of dots in a gradient pattern using a rotogravure type roll. The printed interlayer is then positioned so that the gradient band appears at the top of the windshield in the resulting laminate.

The inks of the prior art used in the printing of plastic sheets for laminated safety glass suffer from one or more deficiencies such as low dye concentration (i.e. less than 10% by weight of dye based on the total weight of dye and solvent), narrow operating temperature range, tendency of the freshly printed sheet to smear, volatility, flammability and toxicity. The low concentration of dye in the solvents of the prior art requires the use of large cells on the rotogravure printing cylinder in order to hold enough ink to obtain the desired density in the darker part of the gradient. These large cells may give rise to printing defects such as mottle, that may require seasoning, i.e., heating of the printed sheet, in order to cause diffusion of the dyes. Small cell spacing i.e., 102 to 178 microns (4 to 7 mils) would be expected to give more uniform printing but they may not provide the optical density required for the darker portions of the gradient bands found in windshields. Attempts to obtain larger cell volume with small cell spacing by making deeper cells leads to cell wall collapse and further printing defects that require seasoning. A need exists in the art for an ink system with a high concentration of dyes in order to obtain the desired optical density.

The deficiencies in the processes of the prior art used to print a gradient band are overcome by the present invention, which provides an ink system having a high concentration of dyes in a solvent with a low order of volatility, flammability and toxicity.

SUMMARY OF THE PRESENT INVENTION

The present invention fulfills a need in the art by providing an improved contact printing process for printing a color gradient on plastic sheet material used in laminated safety glass which process comprises using an ink containing 12 to 35% by weight, based on the total weight of dye and solvent, of one or more dyes dissolved in an N-lower alkyl-pyrrolidone solvent wherein the alkyl group contains from 1 to 4 carbon atoms.

DESCRIPTION OF THE PREFERRED EMBODIMENTS

The plastic sheet material in laminated safety glass may be prepared from various thermoplastic synthetic polymers. Examples of such polymers include polyvinyl butyral, polyurethane, poly(ethylene-vinyl acetate), poly(ethylene-vinyl acetate-vinyl alcohol), poly(ethylene-methylmethacrylateacrylic acid), etc. The preferred materials are plasticized polyvinyl butyral and polyurethane with polyvinyl butyral being especially preferred. These materials are well known to those skilled in the art.

The preferred polyvinyl butyral materials have Staudinger molecular weights ranging from about 50,000 to 600,000 and preferably from 150,000 to 270,000 and may be considered to be made up on a weight basis, of from 5 to 25% hydroxyl groups, calculated as polyvinyl alcohol, 0 to 40% ester groups, calculated as polyvinyl ester, and the balance substantially butyral groups. The polyvinyl butyral resin will preferably contain, on a weight basis, from 9 to 30% hydroxyl groups, calculated as polyvinyl alcohol and from 0 to 3% acetate groups, calculated as polyvinyl acetate, the balance being substantially butyral groups.

The polyvinyl butyral resin used may be plasticized with from about 20 to 80 parts plasticizer per 100 parts resin and more commonly between 25 and 45 parts for normal windshield use. This latter concentration is generally used with polyvinyl butyrals containing 17 to 25% vinyl alcohol by weight. In general, the plasticizers which are commonly employed are esters of a polybasic acid or a polyhydric alcohol. Particularly suitable plasticizers are triethylene glycol di-(2-ethyl butyrate), dihexyl adipate, dibutyl sebacate, and mixtures of phosphates and adipates such as are disclosed in U.S. Pat. No. 3,841,890. The resulting plasticized resin mixture is then generally extruded in the form of sheets which are then printed as described below.

The preferred polyurethane materials are those described in U.S. Pat. Nos. 3,620,905, 3,823,060 and Belgium Pat. No. 785,125, which are incorporated herein by reference.

The dyes used in the present invention are those oil soluble azo dyes and anthroquinone dyes which contain 1 to 4 cyclic nuclei in the dyestuffs molecule, and which when used alone in combination with other dyes will provide the desired color and the dye concentrations required in the present invention. By cyclic nuclei, are meant aromatic nuclei such as benzene, naphthalene, anthracene, etc., nuclei and heterocyclic nuclei such as pyrazolene rings. Dyes of this type are soluble in N-lower alkyl-pyrrolidone solvents used in the present invention. Examples of these dyestuffs include Calco Oil Yellow (C.I. Solvent Yellow 46), Oil Blue A (C.I. Solvent Blue 36), Plasto Violet MR (Solvent Violet 17), Blue Dye (C.I. 61525), Ero Blue, Kohnstamm Orange, Interchem Acetate Violet R Base (Violet No. 1), Plasto Yellow MGS (Solvent Yellow 40), Sumiplast Blue OA, Sumiplast Red FB, Sumiplast Yellow FC (Sumiplast is a trade name for the Sumitomo Chemical Co., Ltd., Japan), Solvent Green No. 19, Solvent Brown No. 33, Anthraquinone Green, Calcophen Yellow ZR, Perox Yellow No. 9, Calco Oil Yellow ZG Conc., Disperse Red 15, (C.I. No. 60710), Yellow Dye (C.I. No. 12700), Amaplast Blue OAP, Amaplast Yellow GHS (C.I. No. 58840), Plasto Pink MBS.

The specific dyes referred to above represent a partial listing of the dyes suitable for use in the inks of the present invention. Other suitable dyes are well known to those skilled in the art. These dyes can be used alone or in various combinations in order to obtain the desired color and hue in the tinted sheet material.

The amount of dye in the inks used in the improved printing processes of the present invention is in the range of from 12 to 35% by weight, based on the total weight of the dye and the solvent. Preferably, the amount of dye is in the range of from 12 to 25% by weight, based on the total weight of the dye and solvent.

The solvents used for the ink compositions of the present invention are the N-lower alkyl-pyrrolidones which may be generally represented as follows:

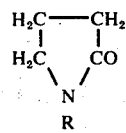

wherein R is an alkyl radical of from 1 to 4 carbon atoms such as methyl, ethyl, propyl, isopropyl, butyl or isobutyl. Methyl is the preferred lower alkyl and N-methyl-pyrrolidone is the preferred solvent.

Preferably, the N-methyl-pyrrolidone is the sole solvent used in the ink. This is especially so when using dye concentrations above 16% by weight at temperatures of 25°C. or higher as the presence of the co-solvent may lead to decreased solubility, precipitation and loss of co-solvent, etc. When using dye concentrations in the range of from 12 to 16% by weight, and ink temperatures above 21°C., minor amounts of a suitable co-solvent may be used provided that the co-solvent does not adversely affect dye solubility, ink stability, etc. Examples of such co-solvents would include toluene, xylene, dialkyl formamides and dialkyl acetamides wherein the alkyl group contains from 1 to 4 carbon atoms with methyl being the preferred alkyl group.

The inks may also contain a small amount of a viscosity control agent which is soluble in the solvent, in order to get the desired ink viscosity. The preferred viscosity control agents have approximately the same polymeric compositions as that of the plastic sheet material being printed. For example, when printing polyvinyl butyral sheets, the ink may contain a small quantity of dissolved polyvinyl butyral in order to obtain the desired viscosity in the ink. When the inks are designed for printing on plasticized sheet material, it may be desirable to use a similar plasticizer in the polymer used as a viscosity control agent.

For printing in accordance with the preferred gravure process of the present invention the Brookfield viscosity of the ink at 25°C. is in the range of from 20 to 500 cps. and more preferably in the range of from 50 to 300 cps. when measured at 25°C. The viscosity of the ink is readily controlled by varying the amount of viscosity control agent and solvent used in the ink.

In addition to viscosity control agents and plasticizers, the inks of the present invention may optionally contain antioxidants, thermal stabilizers, light stabilizers, surfactants, etc., which are commonly found in printing inks.

As stated above, one of the defects found in the gradient bands of freshly printed sheets is that which is referred to as mottle, which is defined as a random non-uniformity in color density. The degree of mottle is determined by laminating a freshly printed sheet between two pieces of glass and then examining the gradient band of the laminate using a uniform light source as a background for the laminate. A trained observer then assigns a mottle rating of from 0 to 10 to the gradient band. Sheets with gradient bands which exhibit a mottle rating of less than 3 are judged to be acceptable for commercial use without any seasoning, i.e., heating of the sheet to achieve a uniform gradient. Mottle ratings above 3 indicate that some amount of seasoning may be required in order to obtain the desired degree of uniformity in the gradient band.

In the preferred printing method, the ink is printed onto the interlayer using rotogravure type printing methods wherein a printing cylinder is engraved so as to form a cell pattern on the surface of the roll. The ink is picked up in the cells and then printed onto the sheet in the form of dots. Cell spacing and cell volume may vary over a wide range. Usually cell spacing is given in terms of the distance from the center of one cell to the center of the closest adjacent cell. The printing cylinders for automobile windshield sheet material are usually designed to give a color gradient. In the gradient printing process the ink is printed in a pattern such that there is a dark section at the top of the sheet which gradually and uniformly fades off into the clear section in the resulting laminated windshield. In this situation the darkest portion of the color gradient has an optical density in the range of from 1.70 to 0.70 which corresponds to a percent light transmission of from 2 to 20%, respectively.

Preferably, the light transmission in the darkest portion of the gradient is in the range of from 4 to 10%. The cell spacings on the gravure cylinder will be in the range of from 51 to 255 microns (2 to 10 mils). The preferred cell spacing is in the range of from 51 to 178 microns and more preferably from 76 to 152 microns (3 to 6 mils). The 51 to 178 microns (2 to 7 mils) cell spacing corresponds to a range of from 197 to 55 cells per centimeter (500 to 140 cells per linear inch) or to 38,800 to 15,500 cells per square centimeter (250,000 to 100,000 cells per square inch), respectively. The 76 to 152 microns (3 to 6 mil) cell spacing corresponds to a range of from 130 to 65 cells per centimeter (330 to 166 cells per linear inch) or to 16,000 to 4,280 cells per square centimeter (108,900 to 27,600 cells per square inch), respectively.

The gradient effect may also be achieved by printing both sides of the sheet. This can be done using printing rolls wherein the size, cell spacing and cell volume are substantially the same or by varying the size, cell spacing, and/or cell volume of one or both of the rolls as is taught by Moynihan in U.S. Pat. No. 3,591,406.

The printing ink temperatures used in the prior art are usually controlled in a very narrow range, e.g., from 21.1° to 37.8°C. (70° to 100°F.), and preferably 26.7° to 32.2°C. (80° to 90°F.). At lower temperatures, there is a tendency for certain ink components to precipitate, while higher temperatures accelerate the loss of the volatile solvents used in the prior art requiring special precautions in regard to minimizing and/or making up the losses. When using N-methyl pyrrolidone as the sole solvent a wider temperature range may be used because of the excellent solvent properties and high boiling point of the preferred solvent used in the present invention.

The present invention is also applicable to those sheet printing operations which do not require a color gradient. These usually involve non-windshield application wherein the sheet is uniformly printed.

The following examples are set forth in illustration of the present invention and should not be construed as a limitation thereof. Unless otherwise indicated, all parts and percentages are by weight.

EXAMPLE 1

This example illustrates the higher dye concentrations which are possible in N-methyl-pyrrolidone (NMP) as compared to other solvents conventionally used in printing inks for interlayers used in laminated safety glass. Conventional dyes such as Yellow (Plasto Yellow MGS), Blue (Amaplast Blue OAP), and Violet (Plasto Violet MR) were dissolved in various solvents in order to determine the solubility of these conventional dyes in the solvent. Solubility tests were conducted at 21°C. (70°F.) and at 45°C. (113°F.). The results of these solubility experiments are tabulated in Table I below.

TABLE I

| | DYE SOLUBILITY IN A SINGLE SOLVENT[1] | | | | | |
|---|---|---|---|---|---|---|
| | Yellow | | Blue | | Violet | |
| Solvent | 21°C. | 45°C. | 21°C. | 45°C. | 21°C. | 45°C. |
| N-methyl-pyrrolidone | 9.6 | 16.1 | 7.0 | 13.5 | 18.5 | 18.6 |
| Gamma-butyrolactone | 2.3 | 5.7 | 2.5 | 6.4 | 8.0 | 6.7 |
| Tetrahydrofurfuryl alcohol | 1.8 | 4.0 | 2.6 | 5.3 | 5.6 | 6.2 |
| Dimethyl sulfoxide | 1.2 | — | 1.4 | — | 19.5 | — |
| 2-Pyrrolidone | 2.3 | — | 0.7 | — | 13.8 | — |
| Anisole | 6.6 | — | 8.9 | — | 0.6 | — |
| Dimethyl acetamide | 4.0 | — | 6.6 | — | 18.6 | — |
| Cyclohexanone | 5.6 | — | — | — | — | — |
| 2-ethyl-1-hexanol | 0.3 | — | — | — | — | — |
| Isoamyl Acetate | 1.9 | — | — | — | — | — |
| N-butyl acetate | 2.4 | — | — | — | — | — |
| Pyridine | 7.7 | — | — | — | — | — |
| Ethyl lactate | 1.0 | — | — | — | — | — |
| Ansul El41 [2] | 3.3 | — | — | — | — | — |
| Diacetone alcohol | 1.0 | — | — | — | — | — |
| Xylene | 4.6 | — | — | — | — | — |
| Isophorone | 4.4 | — | — | — | — | — |
| Ethyl Acetate | 2.0 | — | — | — | — | — |
| Toluene | 6.6 | — | 5.6 | — | 0.2 | — |
| Dimethyl formamide | 4.5 | — | 4.4 | — | 9.9 | — |
| Tetrahydrofuran | 14.0 | — | 11.6 | — | 4.8 | — |

[1]Percent by weight of dye based on total weight of dye and solvent.
[2]Ansul El41 is a trademark of the Ansul Company for diethylene glycol dimethyl ether.

A review of the above data indicates the high dye concentrations which are obtained in NMP at 21°C. Note that some solvents may exhibit better solubility than NMP for specific dyes, e.g., dimethyl sulfoxide/violet, anisole/blue, tetrahydrofuran/yellow/blue. However, these solvents have lower solubility than NMP for the other dyes. Moreover, tetrahydrofuran has a boiling point of 66°C. vs. a boiling point of 202°C. for N-methylpyrrolidone. The low boiling point and high flammability of the tetrahydrofuran makes it undesirable as a solvent notwithstanding the high yellow and blue dye loading that is possible in this solvent.

EXAMPLE 2

Example 1 is repeated here except that the solvent system used is based on a combination of two solvents. The results of the dye solubility in the co-solvent systems are tabulated in Table II below.

TABLE II

| | DYE SOLUBILITY IN A COMBINATION OF SOLVENTS | | | | | | |
|---|---|---|---|---|---|---|---|
| | | Yellow | | Blue | | Violet | |
| Solvents | Ratio | 21°C | 45°C | 21°C | 45°C | 21°C | 45°C |
| Control N-methyl-pyrrolidone | 100% | 9.6 | 16.1 | 7.0 | 13.5 | 18.5 | 18.6 |
| Anisole/dimethyl acetamide | 33/67 | 5.9 | 11.2 | 7.5 | 13.2 | 17.3 | 15.4 |
| N-methyl-pyrrolidone/ 2-ethyl hexanol | 57/43 | 3.9 | 6.0 | 3.8 | 6.7 | 13.7 | 12.9 |
| Tetrahydrofuran/ dimethyl formamide | 67/33 | 9.8 | 15.3 | 12.6 | 18.3 | 12.8 | 14.0 |
| N-butyl acetate/ dimethyl acetamide | 69/31 | 3.5 | — | — | — | — | — |
| N-butyl acetate/ dimethyl formamide | 72/28 | 3.5 | — | — | — | — | — |
| Isoamyl acetate/ | 67/33 | 4.2 | — | — | — | — | — |

TABLE II-continued

| | | DYE SOLUBILITY IN A COMBINATION OF SOLVENTS | | | | | |
|---|---|---|---|---|---|---|---|
| | | Yellow | | Blue | | Violet | |
| Solvents | Ratio | 21°C | 45°C | 21°C | 45°C | 21°C | 45°C |
| pyridine | | | | | | | |

The data in Table II above illustrate that dye concentrations in N-methyl-pyrrolidone (B.P. 202°C.) is greater than that dye concentration achieved in a combination of solvents. An exception to this is the tetrahydrofuran/dimethyl formamide system. However, as discussed above, the high volatility and flammability of tetrahydrofuran (B.P. 66°C.) makes this an undesirable solvent from a safety standpoint.

Examples 1 and 2 illustrate the solubility of a single dye in a solvent or combination of solvents. In many gradient printing applications it becomes desirable or even necessary to use combinations of dyes to obtain the desired color. Examples of dye mixture solubility in solvent combinations listed in Table III are for the ternary dye mixture: Ero Blue (23%), Plasto Violet MR (31%), and Plasto Yellow MGS (46%). This particular combination of dyes was selected to provide a color of the type usually found in the gradient bands in automobile windshields. Organic dyes characteristically vary in dye intensity and impurity content from batch to batch, even when the same nominal dye is purchased from a single supplier. Different dye lots of the above mentioned ternary system may be mixed in somewhat different percentages to achieve the desired color for use in laminated windshield gradients. The "solubility of a dye mixture" at a given temperature is evaluated by spectrophotometrically determining dye concentrations in a series of mixed dye solutions. Dye combinations in a given solvent are considered soluble if (1) spectrophotometric analysis of the centrifuged solution is substantially the same as that of the prepared mixture, and (2) no solid dye particles are present in the centrifuged sludge.

"Supersaturation" or the absence of crystallization at temperatures below the equilibrium saturation limit, is avoided by "seeding" liquid inks with minute amounts of dyes before centrifuging. Spectrophotomeric analysis of a solvent extract of the sludge is a sensitive method used to indicate which dye may be present in excess and therefore is the least soluble of the dye mixture. A second technique for determining solubility of a dye mixture is to prepare a saturated solution at an elevated temperature (about 35°C.) and to condition the opaque mixture at successively lower temperatures until dye crystals can be detected in the centrifuged dye sludge. The temperature at which dye crystals first appear is then correlated with the solubility concentration limit of the particular combination of dyes, solvent (or solvents), viscosity control agents and antioxidants.

Solubilities of dye mixtures in the rotogravure inks referred to herein refer to solubility in the total liquid medium. High loadings of antioxidants (which are required if the colored interlayer sheet is to be temperature-seasoned) will reduce the possible dye loading, compared with that possible when no antioxidant is used. If temperature seasoning of the printed sheet is not required to diffuse rotogravure cell prints to acceptable uniformity, antioxidants may be reduced or eliminated entirely to effect economy as well as to increase dye loading at a given temperature.

Examples of inks given in Table III below illustrate the use of dyes of Examples 1 and 2 in ternary combination to obtain a blue ink for printing the gradient onto an automobile windshield interlayer. The ink was prepared by using about 17% by weight of the ternary dye system in various solvents. In addition to the dyes, the inks also contained polyvinyl butyral resin (to control viscosity) and a conventional antioxidant. In each case the polyvinyl butyral content was 4.8 weight percent of the total solvent concentration and the antioxidant level was 36 weight percent of the total dye content. The solubilities of the inks were evaluated at various temperatures as reported in Table III below.

TABLE III

| | SOLUBILITY OF INK SYSTEMS | | | | |
|---|---|---|---|---|---|
| Solvent System | Solvent Ratio | Test Temp. °C. | Total Dye Soluble[1] | Analysis Sludge[2] | Remarks |
| N-methyl-pyrrolidone | 100% | 15.6 | 17.5% | <2%-yellow ppt | Borderline |
| | | 21.1 | 17.6% | trace-yellow ppt | Acceptable |
| | | 29.4 | 17.3% | None | Acceptable |
| N-methyl-pyrrolidone/dimethyl Formamide | 75/25 | 15.6 | 15.9% | <5%-yellow ppt | Not Acceptable |
| | | 21.1 | 16.7% | <2%-yellow ppt | Borderline |
| | | 29.4 | 17.2% | None | Acceptable |
| N-methyl-pyrrolidone/toluene | 60/40 | 15.6 | 16.7% | — | Acceptable |
| | | 21.1 | 16.6% | — | Acceptable |
| | | 29.4 | 17.9% | — | Acceptable |
| Dipropylene Glycol/Xylene[3] | Not Tested (Resin insoluble -gel formed) | | | | |
| Methyl Amyl Alcohol/N-methyl-pyrrolidone | 38/62 | 21.1 | 13.6% | Yellow ppt | Not Acceptable |
| Dimethyl acetamide/Xylene | 76/24 | 21.1 | 16.8% | slight yellow ppt | Not Acceptable |
| Isoamyl acetate/2-pyrrolidone | 57/43 | 21.1 | 13.4% | yellow ppt | Not Acceptable |
| Dimethyl acetamide/Pyridine | 33/67 | 21.1 | 16.4% | slight yellow ppt | Not Acceptable |

[1]This value is equilibrium dye solubility only when concentration is less than 17%.
[2] Sludge is sediment found in centrifuge tube; ppt is dye that precipitated from solution.
[3]Insoluble gel formed when polyvinyl butyral added to control viscosity.

The addition of DMF to NMP (25/75) had the deleterious effect of causing yellow dye precipitation at 15.6°C. and 21.1°C. When up to 40% toluene is used in combination with NMP no precipitation occurred. However, the volatility of toluene presents some drawbacks in that it could readily be lost from the system. Solvent combinations not using NMP mentioned in Table III resulted in gelation or dye precipitation.

EXAMPE 13

This example illustrates the preparation of an NMP based ink having a high concentration of dyes and the use of this ink to print a gradient band on a conventional sheet of plasticized polyvinyl butyral of the type used in automobile windshields. The ink is prepared from the following ingredients:

INK COMPOSITION

| | Parts by Weight | % |
|---|---|---|
| N-methyl-pyrrolidone | 400.34 | 65.8 |
| polyvinyl butyral | 16.66 | 2.7 |
| antioxidant | 38.30 | 6.3 |
| Amaplast Yellow GHS | 39.47 | 6.5 |
| Plastic Yellow MGS | 35.47 | 5.8 |
| Amaplast Blue OAP | 38.86 | 6.4 |
| Plasto Violet MR | 39.50 | 6.5 |
| Total | 608.60 | 100.0 |

The resulting ink, which has a dye concentration of 25.2% by weight and a Brookfield viscosity of 140 centipoises at 27°C., is printed onto the sheet using a rotogravure cylinder having 127 micron (5 mil) cell spacings. A wide variety of operating conditions such as line, speed, temperature, pressures, etc., are used in the printing process. The printed gradients were the examined for mottle. The mottle ratings for the gradients bands were in the range of from 1 to 5 depending on the printing conditions. Printed sheet with a mottle rating of less than 3 is considered to be acceptable for commercial use without the need for seasoning. Mottle ratings of 3 or higher will require some degree of seasoning prior to commercial use. In each case the printed gradients were found to be commercially acceptable notwithstanding the need for seasoning in those interlayers prepared under operating conditions which produced a higher level of mottle.

EXAMPLE 4

This example illustrates the use of an ink composition having a 16.8% by weight of dye loading. The ink used in Example 3 above was diluted with a solution of a polyvinyl butyral in N-methyl-pyrrolidone to obtain an ink having a dye loading of about 16.8%. The sheet was printed as in Example 3 above using a wide variety of operating conditions and examined for mottle. The mottle ratings for the gradient band were in the range of from 1 to 5 depending on the printing conditions. All the printed gradients were deemed commercially acceptable notwithstanding the need for further seasoning.

EXAMPLE 5

An ink similar to that used in Example 3 above was prepared having a dye loading of about 14.9%. The sheet was printed as in Example 3 above using a wide variety of operating conditions, and examined for mottle. The mottle ratings for the gradient bands are in the range of from 2 to 4 depending on the printing conditions. All the printed gradients were deemed commercially acceptable notwithstanding the need for further seasoning.

EXAMPLE 6

An ink similar to that used in Example 3 above was prepared having a dye loading of about 10.0%. The sheet was printed as in Example 3 above using a gravure roll with 127 micron (5 mil) cell spacing and a wide variety of operating conditions. The dark portion of the gradient was unacceptable in that the light transmission was in excess of 10%. This is attributed to using a combination of an ink with a low dye loading and a gravure roll with a 127 micron cell spacing.

When using 127 micron (5mil) cell spacing and printing only one side of the sheet, the dye loading should be at least 14.5% with the dyes used in this example in order to obtain a light transmission of from 4 to 10% in the dark portion of the gradient. At 178 micron (7 mil) cell spacings the dye concentration should be at least 12.6% in order to obtain the desired optical density. High dye concentrations, e.g., 16.7% will be needed when using 76 micron (3 mil) cell spacing.

EXAMPLES 7 to 10

Examples 7 to 10 illustrate other inks prepared according to the teachings of the present invention using NMP as the sole solvent. These ink compositions along with the minimum temperature needed for complete solubility of the ink are summarized in Table IV below:

TABLE IV

SUMMARY OF INKS OF EXAMPLES 7 to 10

| Ingredients | Example 7 | Example 8 | Example 9 | Example 10 |
|---|---|---|---|---|
| N-methyl-pyrrolidone | 70.71% | 71.41% | 57.13% | 63.11% |
| Polyvinyl butyral | 3.36% | 3.38% | 2.69% | 3.02% |
| Antioxidant | 6.89% | — | 10.68% | — |
| Amaplast Yellow GHS | — | — | 7.60% | 8.70% |
| Plasto Yellow MGS | 8.82% | 11.68% | 6.82% | 7.82% |
| Amaplast Blue OAP | 4.35% | 5.76% | 7.48% | 8.57% |
| Plasto Violet MR | 5.86% | 7.76% | 7.60% | 8.71% |
| Total | 100.0% | 100.0% | 100.0% | 100.0% |
| Total Dye Loading | 19.03 | 25.2 | 29.5 | 33.8 |
| Minimum Temperature for Complete Solubility | 85°F 29°C. | 100°F 38°C. | 100°F 38°C | 105°F 40°C |

As stated above, the low volatility of NMP minimizes solvent odor, fire hazards and changes in the ink viscosity. In addition, NMP based inks appear to "dry" much faster than toluene/dimethyl formamide or tetrahydrofuran/dimethyl formamide based inks of the prior art. The expression dry is used to indicate non-transfer or non-smearing properties of the ink on the printed portion as opposed to drying through the removal of solvent. The high boiling point (202°C.) of NMP would indicate that drying is not achieved in the conventional sense by evaporation of the solvent. In the case of NMP based inks it appears that the NMP penetrates into the sheet at a very rapid rate or else reacts with the sheet in some manner, leaving the printed surface dry to the touch in a very short time after the printing step. This phenomena is illustrated in the following Example 11.

EXAMPLE 11

The rapid drying properties of the NMP based inks of the present invention are demonstrated by printing plasticized polyvinyl butyral sheet with an NMP based ink, a toluene/dimethyl formamide based ink, and a tetrahydrofuran/dimethyl formamide based ink. The same printing conditions are used for each ink. Three feet after the printing nip a hand inserted into a white glove is rubbed across the printed portion of the sheet and the glove is then examined for ink transfer. The NMP based ink does not transfer to the white glove whereas the other two inks smear and transfer to the white glove. This unexpected drying property of NMP based inks permits faster line speeds while minimizing ink transfer or strike off in the rolled sheet.

Lastly, it should be noted that the preferred N-methyl-pyrrolidone solvent is hydroscopic. Consequently, precautions should be taken to avoid excessive moisture pick up which may adversely effect the solubility of the dyes or other components in the ink. Means for preventing excess moisture pick up are well known to those skilled in the art.

As stated above, the inks of the present invention can be used in a wide variety of contact printing methods including rotogravure, relief printing, planographic, flexographic, etc. The inks and printing processes of the present invention may also be used to print other synthetic sheet materials used to make laminated safety glass. The printing conditions used will depend on the nature of the interlayers, apparatus and printing conditions used. These variables are well known in the art and need no further explanation here.

What is claimed is:

1. In the process for printing polyvinyl butyral sheet material used as a component in laminated safety glass said process comprising printing the polyvinyl butyral sheet material with an ink comprising a solvent and at least one dye dissolved in the solvent, the improvement which comprises using an ink having a dye concentration in the range of from 12 to 35% by weight wherein an N-lower alkyl pyrrolidone is used as the major component of the solvent for the ink.

2. An improved process as in claim 1 wherein the solvent is N-methyl-pyrrolidone.

3. An improved process as in claim 2 wherein the solvent contains minor amounts of a co-solvent selected from the group consisting of toluene, xylene, dialkyl formamides and dialkyl acetamides wherein the alkyl group contains from 1 to 4 carbon atoms.

4. An improved process as in claim 1 wherein the dye concentration is above 16% by weight based on the total weight of dye and solvent.

5. In the process for printing a gradient band on polyvinyl butyral sheet material used in the manufacture of laminated safety glass said process comprising printing the polyvinyl butyral sheet material with an ink comprising a solvent and at least one dye dissolved in the solvent, the improvement which comprises an ink dye having a dye concentration in the range of from 12 to 35% by weight wherein N-methyl pyrrolidone is used as the major component of the solvent for the ink.

6. An improved process as in claim 5 wherein the solvent contains minor amounts of a co-solvent selected from the group consisting of toluene, xylene, dialkyl formamides and dialkyl acetamides wherein the alkyl group contains from 1 to 4 carbon atoms.

7. An improved process as in claim 5 wherein the dye concentration is in the range of from 12 to 25% by weight based on the total weight of dye and solvent.

8. In the process for printing a gradient band on polyvinyl butyral sheet material used in the manufacture of laminated safety glass said process comprising printing the thermoplastic sheet material with an ink comprising a solvent and at least one dye dissolved in the solvent, the improvement which comprises using an N-lower alkyl pyrrolidone as the sole solvent for the ink wherein the dye concentration in the ink is in the range of from 12 to 25% by weight based on the total weight of dye and solvent.

* * * * *